（12） United States Patent
Lin

(10) Patent No.: US 8,899,843 B2
(45) Date of Patent: Dec. 2, 2014

(54) OPTICAL FIBER COUPLER

(75) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 13/592,654

(22) Filed: Aug. 23, 2012

(65) Prior Publication Data

US 2013/0163926 A1 Jun. 27, 2013

(51) Int. Cl.
*G02B 6/32* (2006.01)
*G02B 6/38* (2006.01)
*G02B 6/42* (2006.01)
*G02B 6/36* (2006.01)

(52) U.S. Cl.
CPC ............... *G02B 6/32* (2013.01); *G02B 6/4204* (2013.01); *G02B 6/3652* (2013.01); *G02B 6/3882* (2013.01)
USPC .............................................. 385/74; 385/33

(58) Field of Classification Search
None
See application file for complete search history.

(56) References Cited

U.S. PATENT DOCUMENTS 5,923,803 A * 7/1999 Bunin et al. ..................... 385/80
7,985,026 B1 * 7/2011 Lin et al. ......................... 385/71

* cited by examiner

*Primary Examiner* — Jerry Rahll
(74) *Attorney, Agent, or Firm* — Novak Druce Connolly Bove + Quigg LLP

(57) ABSTRACT

An optical fiber coupler includes a main body and a cover detachably coupled with the main body. The main body includes a coupling member, at least two lenses, at least two optical fibers and a connecting post. The lenses and the optical fibers are mounted on the coupling member. The optical fibers couples with corresponding lenses. The lenses protrudes from the coupling member. The connecting post protrudes from the main body adjacent to the lenses. The cover defines a fixing hole and a covering groove corresponding to the lenses. The fixing hole engages with the connecting post, for positioning the coupling member to the cover. The cover covering the lenses via allowing the at least two lenses to be received in the covering groove.

14 Claims, 4 Drawing Sheets

OPTICAL FIBER COUPLER

BACKGROUND

1. Technical Field

The present disclosure relates to an optical fiber connector, particularly to an optical fiber coupler employed in the optical fiber connector.

2. Description of Related Art

An optical fiber coupler is configured to abut joint at least two optical fibers. The optical fiber coupler may include a main body. The main body may include a coupling member, a plurality of transmission lenses, and a plurality of optical fibers. The transmission lenses are mounted on the coupling member, and partially protrude from the coupling member. The optical fibers are mounted on the coupling member, and are coupled with the transmission lenses. Because the transmission lenses protrude and are exposed from the coupling member, which results in the transmission lenses may become polluted, and thus causes a low optical signal transmission precision and efficiency.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
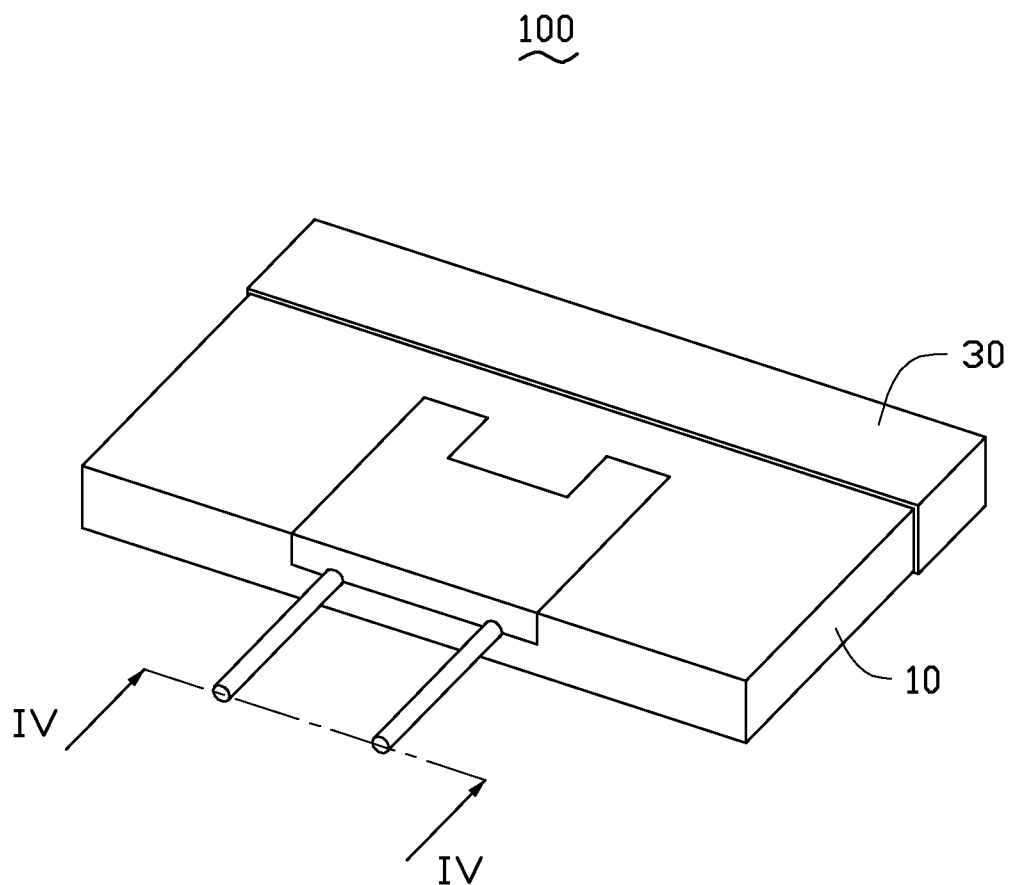
FIG. 1 is an isometric view of an embodiment of an optical fiber coupler.

Referring to FIG. 1, an embodiment of an optical fiber coupler 100 is shown. The optical fiber coupler 100 includes a main body 10 and a cover 30 detachably coupled with the main body 10.

Figure 2:
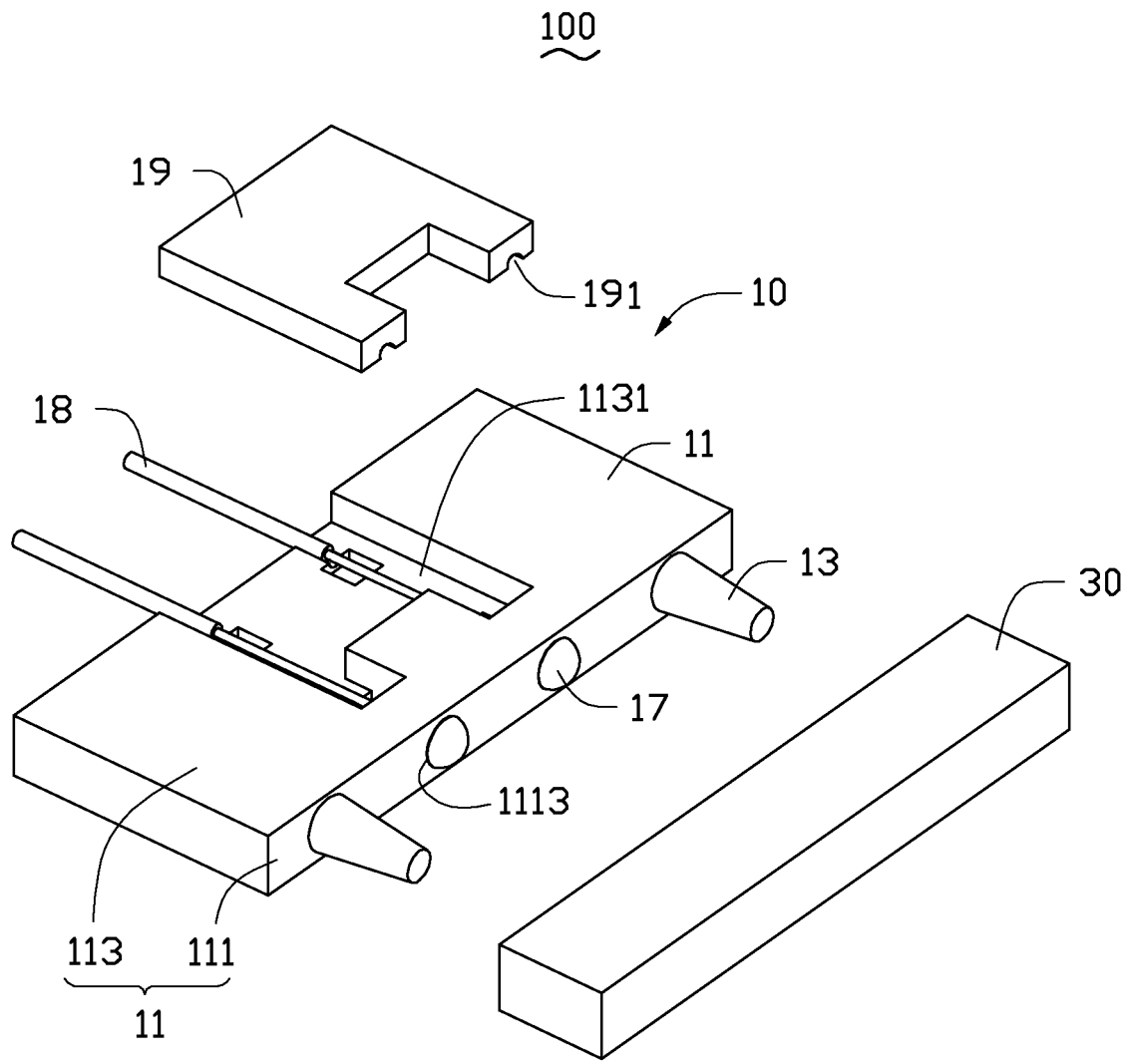
FIG. 2 is an exploded, isometric view of the optical fiber coupler shown in FIG. 1.
Figure 3:
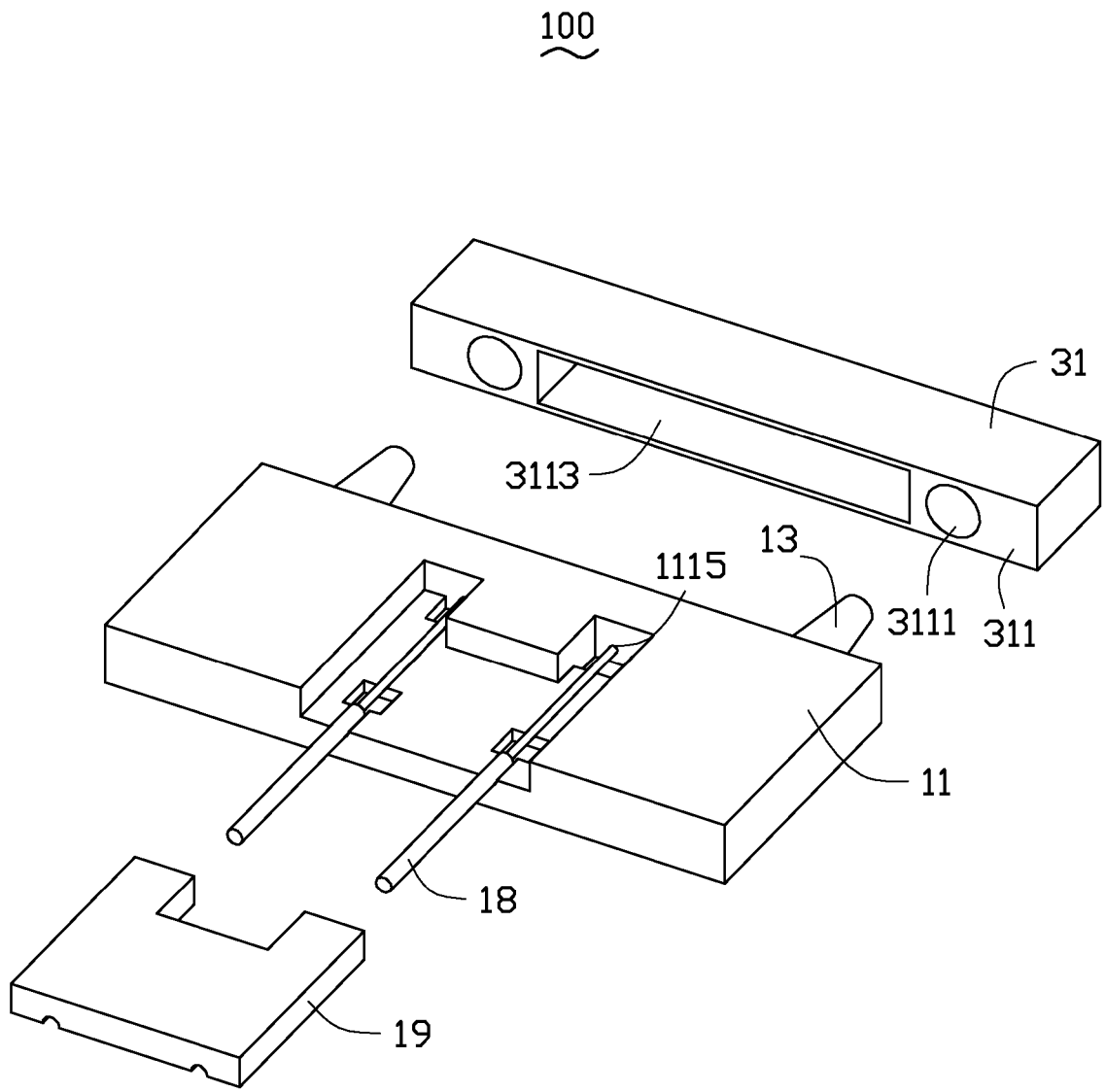
FIG. 3 is similar to FIG. 2, but viewed from another aspect.
Figure 4:
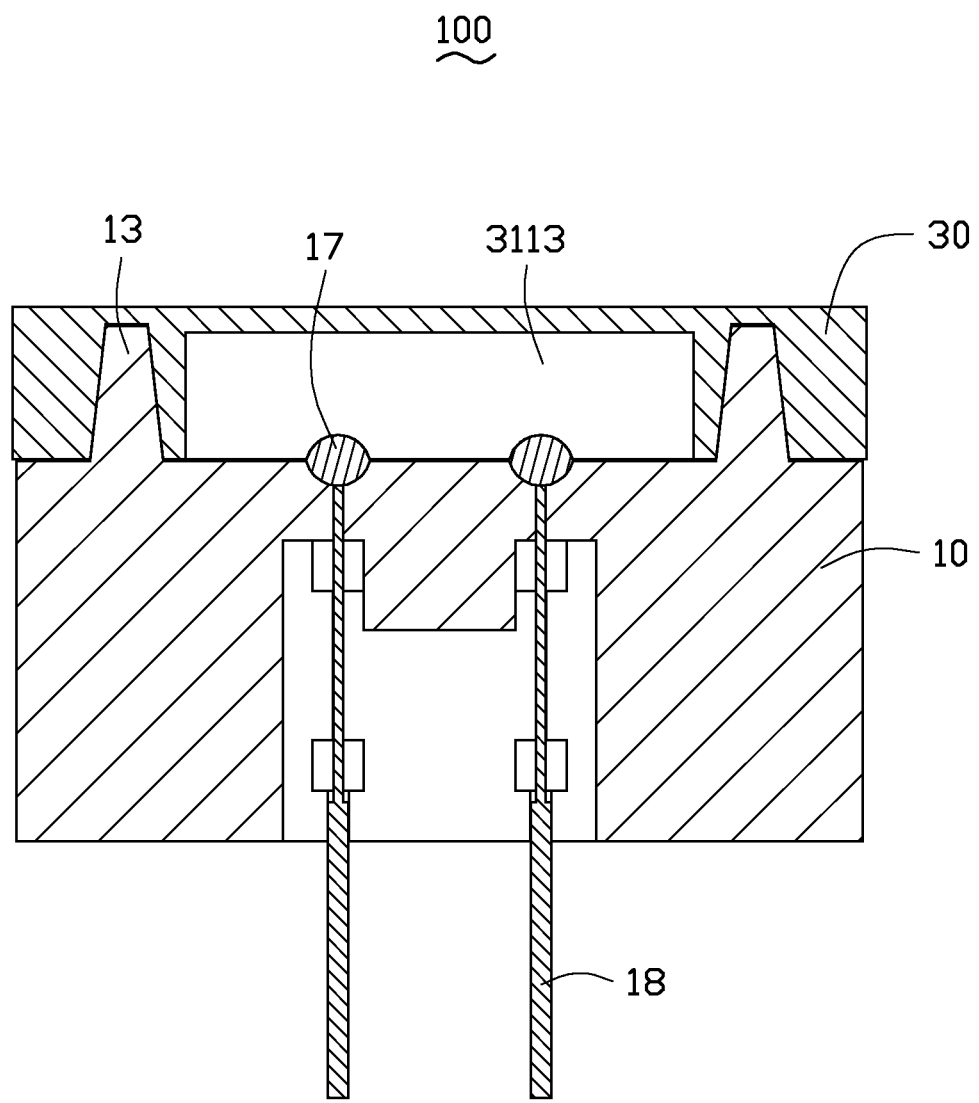
FIG. 4 is a sectional view taken along line IV-IV of FIG. 1.

Referring to FIGS. 2 through 4, the main body 10 of the embodiment is shown. The main body 10 includes a coupling member 11, a pair of connecting posts 13, a pair of lenses 17, a pair of optical fibers 18 and a positioning cover 19. The coupling member 11 includes a first mounting surface 111 and a second mounting surface 113 perpendicular to the first mounting surface 111. The first mounting surface 111 defines a pair of receiving grooves 1113 arranged apart, for mounting the pair of lenses 17. A bottom surface of each receiving groove 1113 defines a through hole 1115. The second mounting surface 113 defines a U-shaped mounting groove 1131, for mounting the optical fibers 18. A pair of protruding portions of the mounting groove 1131 respectively extend towards the pair of receiving grooves 1113. The mounting groove 1131 communicates with the through holes 1115.

The pair of connecting posts 13 perpendicularly protrude from the first mounting surface 111, and are located at opposite ends of the first mounting surface 111. The connecting post 13 is substantially a conical frustum, and a diameter thereof gradually decreases along a direction away from the first mounting surface 111. The lenses 17 are fixed within corresponding receiving grooves 1113, and partially protrude and are exposed from the receiving grooves 1113. The optical fibers 18 are mounted in the mounting groove 1131 of the coupling member 11. A distal end of each optical fibers 18 passes through a corresponding through hole 1115, and is coupled with a corresponding lens 17, for transmitting optical signals.

The positioning cover 19 is substantially U-shaped, and corresponding to the shape of the mounting groove 1131. The bottom surface of the positioning cover 19 defines a pair of positioning grooves 191 separated from each other and corresponding to the optical fibers 18, for positioning the optical fibers between the positioning cover 19 and the coupling member 11.

In other embodiments, the positioning cover 19 can be omitted, and the optical fibers are position in the mounting groove 1131. The number of the receiving grooves 1113 can be more than two, and the number of the lenses and the optical fibers are more than two correspondingly.

The cover 30 is substantially rectangular, and nests with the coupling member 11. The cover 30 includes a base body 31. The base body 31 includes a connecting surface 311 facing the first mounting surface 111. The connecting surface 311 defines a pair of fixing holes 3111 and a coving groove 3113 between the fixing holes 3111. The fixing holes 3111 engage with corresponding connecting posts 13 of the coupling member 11, for precisely positioning the coupling member 11 to the cover 30. The fixing hole 3111 is substantially a conical frustum, and a diameter thereof gradually decreases along a direction away from the connecting surface 311. The covering groove 3113 is positioned corresponding to the receiving grooves 1113, and receives the lenses 17. In other embodiments, the connecting post 13 can be one or more than one, and the fixing hole 3111 can be one or more than one corresponding to the connecting post 13.

Because the optical fiber coupler 100 includes a main body 10 and a cover 30 detachably coupling with the main body 10, and the cover 30 covers the lenses 17, thus the lenses 17 can stay clean, protected by the cover 30, which results in a high optical signal transmission precision and a high transmission efficient. In addition, the lenses 17 are received in the coving groove 3113 and protected by the base body 31, thus avoiding damage to the lenses 17 when being loaded in the optical fiber coupler 100.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An optical fiber coupler, comprising:
    a main body comprising a coupling member, at least two lenses, at least two optical fibers and a connecting post, the at least two lenses and the at least two optical fibers mounted on the coupling member, the coupling member comprising a first mounting surface, the at least two optical fibers coupled with corresponding at least two lenses, the at least two lenses protruding from the first mounting surface of the coupling member, the connecting post protruding from the first mounting surface of the coupling member adjacent to the at least two lenses, and
    a cover detachably coupled with the main body, the cover comprising a base body, the base body comprising a connecting surface, the connecting surface of the cover defining a fixing hole and a covering groove corresponding to the at least two lenses, the fixing hole engaged with the connecting post, for positioning the coupling member to the cover, the cover covering the lenses and the first mounting surface contacting the connecting surface, for allowing the at least two lenses receiving in the covering groove.

2. The optical fiber coupler of claim 1, wherein the first mounting surface faces the cover, the first mounting surface defines at least two receiving grooves, and the at least two lenses are fixed within corresponding receiving grooves.

3. The optical fiber coupler of claim 2, wherein the coupling member further comprises a second mounting surface perpendicular to the first mounting surface, the second mounting surface defines a mounting groove, a bottom surface of each of the receiving grooves defines a through hole communicating with the mounting groove, the at least two optical fibers are mounted on the coupling member, and received in the mounting groove, a distal end of each optical fiber passes through the through hole, and is coupled with the corresponding lens.

4. The optical fiber coupler of claim 3, wherein the main body further comprises a positioning cover corresponding to the mounting groove, the positioning cover is substantially U-shaped, the at least two optical fibers are positioned between the coupling member and the positioning cover.

5. The optical fiber coupler of claim 4, wherein a bottom surface of the positioning cover defines at least two positioning grooves, the at least two optical fibers are positioned in the corresponding positioning grooves.

6. The optical fiber coupler of claim 2, wherein the connecting post is a conical frustum, and a diameter of the connecting post gradually decreases along a direction away from the first mounting surface.

7. An optical fiber coupler, comprising:
a main body comprising a coupling member, at least two lenses, at least two optical fibers and a positioning cover, the at least two lenses and the at least two optical fibers mounted on the coupling member, the coupling member comprising a first mounting surface, the at least two lenses protruding from the first mounting surface of the coupling member, the positioning cover covering the coupling member, the at least two optical fibers positioned between the coupling member and the positioning cover, and are coupled with corresponding at least two lenses, and a cover detachably coupled with the main body, the cover comprising a base body, the base body comprising a connecting surface, the connecting surface of the cover defining a covering groove corresponding to the at least two lenses, the cover covering the lenses and the first mounting surface contacting the connecting surface, to enable the at least two lenses to be received in the covering groove.

8. The optical fiber coupler of claim 7, wherein the first mounting surface faces the cover, the main body further comprises a connecting post protruding from the first mounting surface adjacent to the at least two lenses, the at least two lenses are fixed within corresponding receiving grooves, the cover further defines a fixing hole engaged with the connecting post, for positioning the coupling member to the cover.

9. The optical fiber coupler of claim 8, wherein the coupling member further comprises a second mounting surface perpendicular to the first mounting surface, the second mounting surface defines a mounting groove, a bottom surface of each of the receiving grooves defines a through hole communicating with the mounting groove, the at least two optical fibers are mounted on the coupling member, and received in the mounting groove, a distal end of each optical fiber passes through the through hole, and is coupled with the corresponding lens.

10. The optical fiber coupler of claim 9, wherein the positioning cover covers the mounting groove.

11. The optical fiber coupler of claim 10, wherein a bottom surface of the positioning cover defines at least two positioning grooves, the at least two optical fibers are positioned in the corresponding positioning grooves.

12. The optical fiber coupler of claim 8, wherein the connecting post is a conical frustum, and a diameter of the connecting post gradually decreases along a direction away from the first mounting surface.

13. The optical fiber coupler of claim 7, wherein the cover is substantially rectangular.

14. The optical fiber coupler of claim 7, wherein the positioning cover is substantially U-shaped.

* * * * *